3,171,288
SWASH PLATE PUMPS AND MOTORS
Donald Firth and Roger Harvey Yorke Hancock, Glasgow, Scotland, assignors to Council for Scientific and Industrial Research, London, England, a body corporate
Filed May 22, 1961, Ser. No. 111,720
Claims priority, application Great Britain, June 10, 1960, 20,423/60
11 Claims. (Cl. 74—60)

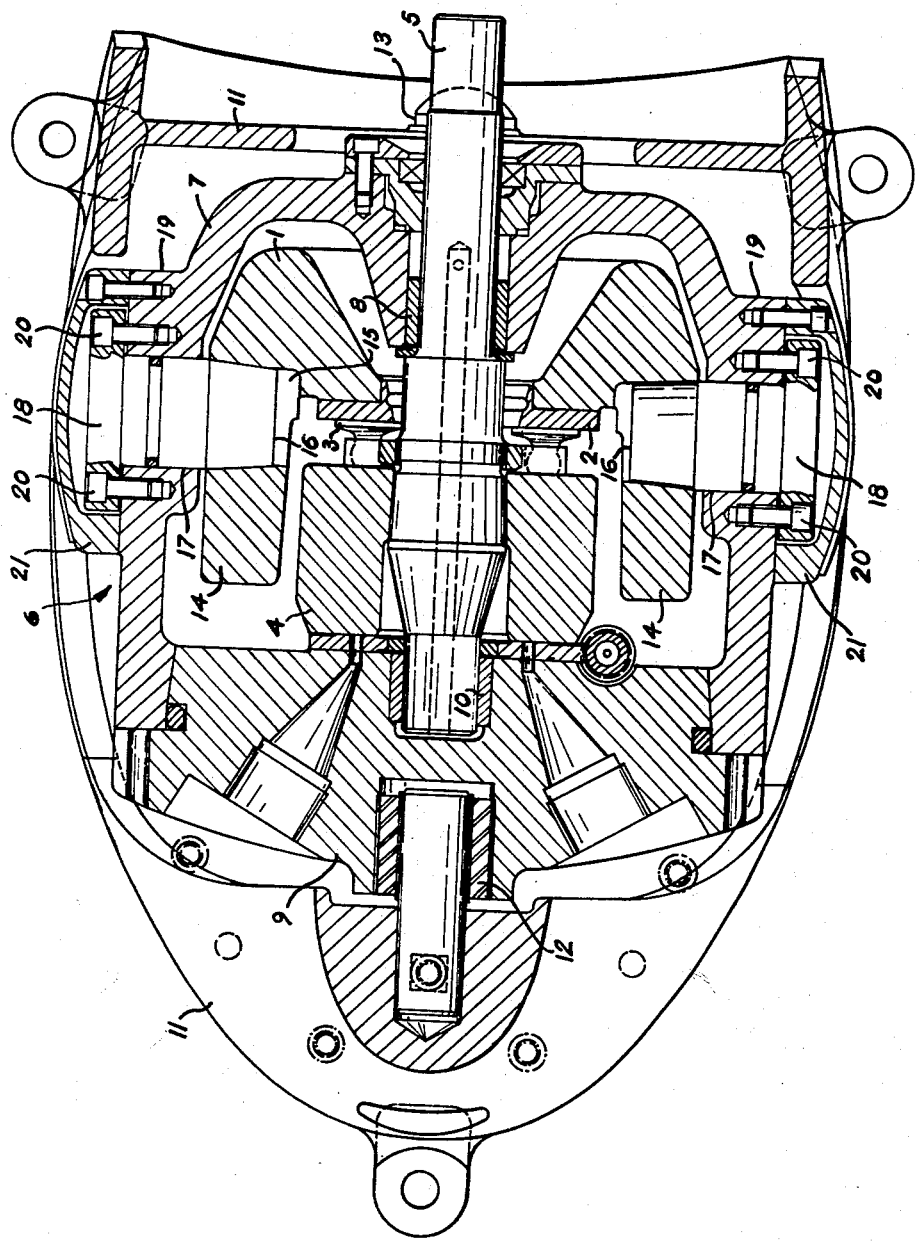

This invention relates to swash plate rotary machines, and has for an object to provide a construction whereby the noise of operation of the machine is reduced.

In the operation of a swash plate or motor the swash plate is subjected to cyclically varying thrusts tending to rock it about its axis of adjustment of inclination, these forces being a function of the speed and number of cylinders of the pump or motor.

Hitherto, the bearing surfaces of trunnions by which the swash plate has been mounted in the frame of the machine have been made cylindrical and no special precautions beyond good engineering tolerances have been taken to prevent side play in the swash plate in the direction of the trunnion axis.

In machines as hitherto constructed, it has been observed that the external noise of operation arises from several sources including the trunnions themselves, and a definite zone of radiated noise is detectable which is polarised about the trunnion axis. The present invention aims at reducing the noise arising from the pivotal mounting of the swash plate.

The invention provides a swash plate rotary machine having a swash plate mounted for tilting between two pivots each of which has a pair of complementally tapered bearing faces and having loading means for imposing an axial load on each pivot so as to press the respective bearing faces of each pair towards each other.

Preferably each pivot comprises a trunnion carried by a fixed part of the machine (e.g. the frame thereof) and having a conical surface fitting in a conical socket formed in the swash plate, and the loading means comprises means for forcing the trunnions into the sockets.

Each trunnion may comprise an axially-adjustable peg having a cylindrical portion accommodated in said fixed part of the machine and having an end portion provided with said conical surface. Each peg preferably has a flange or head secured to said fixed part on the opposite side to the swash plate by a screw-threaded connection which constitutes the aforesaid loading means.

To reduce further the noise emitted by the machine, the flange or head of each peg may be enclosed by a cap of a non-resonant material which is secured to said fixed part and has a positive clearance around said flange or head. The material of the cap is preferably a metal such as aluminum having a high internal damping factor.

The following is a description, by way of example, of a preferred embodiment of the invention as applied to a swash plate machine of the kind described in our patent application Ser. No. 22,334, filed April 14, 1960, now Patent No. 3,089,427.

Reference is made to the accompanying drawing which shows a cross-section of the machine.

The machine has a swash plate 1 having a flat working surface 2 on which bear the slippers 3 which control the motions of the pistons in the cylinder block 4. The cylinder block is clamped on the shaft 5 which constitutes the input of the machine if used as a pump, or the output if used as a motor. The shaft 5 is carried in bearings in a frame 6 which consists of a deep cup part 7 carrying the outer shaft bearing 8 and a relatively heavy end block 9 carrying the inner shaft bearing 10. The frame 6 is supported in an outer cradle 11 by means of an axially aligned flexible bushing 12 in the end block 9 and three rubber bushings of conventional design—one of which is indicated at 13—in the base of the cup portion 7. The bushings 13 are dispersed on a pitch circle concentric with the shaft 5.

The swash plate 1 has a pair of diametrically opposed ears or lugs 14 in which are formed conical sockets 15 the common axis of which lies substantially in the plane of the surface 2. Each socket 15 receives the correspondingly coned end 16 of a trunnion 17 which is constituted by a flanged or headed peg of generally cylindrical shape, having a cylindrical portion fitting in the frame 6, and having its head 18 located adjacent the radial surface of an external boss 19 on the cup part 7 of the frame 6. The coned end 16 of each trunnion peg constitutes a bearing on which the swash plate 1 can be pivoted for the purpose of adjusting the inclination of the plane of the working surface 2 to the axis of the shaft 6. The angle of adjustment of the swash plate is preferably determined by a mechanical or hydraulic jack system between the swash plate 1 and the end block 9 of the frame 6, such a system being illustrated in the specification of our United Kingdom patent application No. 19,674/60.

In order to reduce the force required to be exerted by the jacks to adjust the angle of tilt of the swash plate, a thin layer of a dry bearing material, such as polytetrafluorethylene, may be provided between the conical surfaces of the trunnions and the sockets. This layer, which suitably has a thickness of the order of 0.004 inch, may be applied as a coating to the trunnions and/or the sockets. It is believed that the layer may also assist in reducing vibrations transmitted through the trunnions.

The length of each trunnion peg is slightly greater than would allow both heads or flanges 18 to bed on to their respective bosses 19 when the coned bearing surfaces 16 are fully entered into the swash plate sockets 15. When, however, the trunnion pegs 17 are thus mounted in the working position, there is a relatively small clearance between each head 18 and the surface of the corresponding boss 19, and the trunnions are axially pre-stressed by means of bolts 20 which pass through each head or flange 18 into the boss 19 of the frame 6. The amount of pre-stressing is therefore determined by the degree of tightening of the bolts 20, and this may be controlled by a torque limiting wrench.

Over and enclosing each trunnion head 18 with internal clearance is bolted a cap 21 of a non-resonant material such as aluminium which has a relatively high coefficient of internal damping. Other materials may, however, be used if preferred—for example, a synthetic resin bonded fibre glass or synthetic resin impregnated textile laminate.

Tests on a machine constructed in accordance with the foregoing description have shown that by suitably pre-stressing the trunnions 17 the amount of noise emitted in the direction of the axis of the trunnions is substantially reduced, and that further sound deadening is achieved by the action of the caps 21. The isolation of the frame 6 from the cradle 11 by means of the flexible bushings 12, 13 also contributes to the reduction in the general noise radiated from the machine.

Other forms of pre-stressed trunnion may be adopted if preferred. For example, each peg 17 may be threaded into its respective boss 19, the periphery of the head 18 being notched or recessed so as to be engageable by a locking pin screwed or driven into the boss 19.

We claim:
1. In a swash plate rotary machine, the combination of a swash plate tiltably mounted between two pivots each of which has a pair of complementally tapered bearing faces with loading means imposing an axial load on each pivot and pressing the respective bearing faces of each pair towards each other.

2. In a swash plate rotary machine, two pivots each comprising a conical bearing and a trunnion having a complemental conical surface fitting into the bearing, a swash plate tiltably carried between the pivots and loading means forcing each trunnion into its bearing.

3. In a swash plate rotary machine, the combination of a swash plate tiltably mounted between two pivots each comprising a trunnion carried by a fixed part of the machine and having a conical surface fitting into a complemental conical recess in the swash plate with loading means urging the trunnions into the recesses.

4. The combination according to claim 3 wherein each trunnion comprises a peg having a cylindrical portion accommodated in said fixed part and having an end portion provided with said conical surface.

5. In a swash plate rotary machine, the combination of a swash plate tiltably mounted between two pivots each comprising a trunnion having a cylindrical portion accommodated in a fixed part of the machine and a conical portion fitting into a complemental conical recess in the swash plate with loading means forcing the trunnions into the recesses.

6. The combination according to claim 5 wherein each trunnion has an end flange and an adjustable screw-threaded connection is provided between the flange and the fixed part of the machine.

7. The combination according to claim 6 wherein a substantially rigid cap is secured to said fixed part of the machine completely enclosing each trunnion end flange with a positive clearance therefrom.

8. A pivotal swash-plate mounting comprising two coaxial tapered trunnions carried by a fixed support and engaging in complementally tapered recesses in the swash plate, said trunnions being axially movable on the support, and loading means for moving the trunnions axially towards each other.

9. A combination according to claim 7 wherein the cap is made of aluminium.

10. A combination according to claim 7 wherein the cap is made of synthetic-resin-bonded glass fibre.

11. A combination according to claim 7 wherein the cap is made of synthetic-resin-impregnated textile laminate.

References Cited by the Examiner
UNITED STATES PATENTS

| | | | |
|---|---|---|---|
| 748,322 | 12/03 | Fisch et al. | 308—64 X |
| 1,712,310 | 5/29 | Sayre | 308—64 |
| 1,945,391 | 1/34 | Benedek | 103—162 |
| 2,543,624 | 2/51 | Gabriel | 103—162 |
| 2,557,331 | 6/51 | Wintercorn | 280—11.28 |
| 2,928,589 | 3/60 | Daney | 230—232 |
| 2,987,983 | 6/61 | Solzman | 98—43 |

FOREIGN PATENTS

| | | |
|---|---|---|
| 702,370 | 4/31 | France. |
| 703,196 | 3/41 | Germany. |
| 712,493 | 7/54 | Great Britain. |

OTHER REFERENCES

Newkirk, J. B.; General Theory Mechanism and Kinetics, "Precipitation From Solid Solution," published by the American Society for Metals, Cleveland, Ohio, received in library Aug. 28, 1959, page 103.

BROUGHTON G. DURHAM, *Primary Examiner.*